(12) United States Patent
Pan et al.

(10) Patent No.: US 11,015,432 B2
(45) Date of Patent: May 25, 2021

(54) RELATIVE AZIMUTH CORRECTION FOR RESISTIVITY INVERSION

(71) Applicant: Halliburton Energy Services, Inc., Houston, TX (US)

(72) Inventors: Li Pan, Singapore (SG); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 16/462,122

(22) PCT Filed: Jul. 10, 2018

(86) PCT No.: PCT/US2018/041490
§ 371 (c)(1),
(2) Date: May 17, 2019

(87) PCT Pub. No.: WO2020/013812
PCT Pub. Date: Jan. 16, 2020

(65) Prior Publication Data
US 2020/0270982 A1      Aug. 27, 2020

(51) Int. Cl.
*E21B 47/0228*       (2012.01)
*E21B 47/0224*       (2012.01)
(Continued)

(52) U.S. Cl.
CPC ...... *E21B 47/0228* (2020.05); *E21B 47/0224* (2020.05); *G01V 3/26* (2013.01); *G01V 3/38* (2013.01)

(58) Field of Classification Search
None
See application file for complete search history.

(56) References Cited

U.S. PATENT DOCUMENTS

| 8,274,289 B2 | 9/2012 | Bittar et al. |
| 8,442,769 B2 | 5/2013 | Phillips et al. |

(Continued)

FOREIGN PATENT DOCUMENTS

WO       2014200491       12/2014

OTHER PUBLICATIONS

ISRWO International Search Report and Written Opinion for PCT/US2017/101916 dated Mar. 28, 2019.

*Primary Examiner* — Brent A. Fairbanks
(74) *Attorney, Agent, or Firm* — Benjamin Ford; C. Tumey Law Group PLLC (57) ABSTRACT

A method may comprise: inserting into a wellbore penetrating a subterranean formation a tool comprising: a transmitter sub assembly comprising a transmitter; and a receiver sub assembly comprising a receiver; generating an electromagnetic wave at the transmitter; propagating the electromagnetic wave through the subterranean formation; receiving the electromagnetic wave in the receiver; generating a response signal in the receiver; calculating a distance to a bed boundary position in a TVDp direction, wherein the TVDp direction is a direction where an angle between the TVDp direction and a tool axis is equal to a tool inclination from a true vertical direction (TVD), wherein TVD is a direction with respect to gravity; calculating a distance to bed boundary in a TST direction, wherein the TST direction is a true stratigraphic thickness direction in a direction towards a bed boundary; calculating a distance to bed boundary in a TVD direction; generating a formation characterization comprising a visual representation of the response signal and the distance to bed boundary in the TVD direction.

18 Claims, 6 Drawing Sheets

(51) Int. Cl.
*G01V 3/26* (2006.01)
*G01V 3/38* (2006.01)

(56) References Cited

U.S. PATENT DOCUMENTS

| | | | |
|---|---|---|---|
| 2005/0140373 A1* | 6/2005 | Li | G01V 3/30 |
| | | | 324/338 |
| 2005/0154532 A1* | 7/2005 | Close | E21B 47/022 |
| | | | 702/6 |
| 2006/0253255 A1 | 11/2006 | Omeragic et al. | |
| 2013/0226461 A1* | 8/2013 | Yu | E21B 47/00 |
| | | | 702/9 |
| 2015/0134255 A1* | 5/2015 | Zhang | G01V 99/005 |
| | | | 702/7 |
| 2016/0002977 A1 | 1/2016 | Wu et al. | |
| 2017/0038495 A1 | 2/2017 | Witkowsky et al. | |

* cited by examiner

RELATIVE AZIMUTH CORRECTION FOR RESISTIVITY INVERSION

BACKGROUND

Modern petroleum drilling and production operations may demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools exist for use in LWD. One such tool is the resistivity tool, which includes one or more antennas for transmitting an electromagnetic signal into the formation and one or more antennas for receiving a formation response. Physical phenomena that determine how the measurement is made may vary with frequency, for example. In some examples, the amplitude and/or the phase of the receive signals are compared to the amplitude and/or phase of the transmit signals to measure the formation resistivity. In other cases, the amplitude and/or phase of multiple receive signals are compared to each other to measure the formation resistivity.

When plotted as a function of depth or tool position in the borehole, the logging tool measurements are termed "logs." Resistivity logging may be used in well logging to determine geological correlation of formation strata and detect and quantify potentially productive formation zones. Such logs may provide indications of hydrocarbon concentrations and other information useful to drillers and completion engineers. In particular, azimuthally-sensitive logs may provide information useful for steering the drilling assembly because they can inform the driller when a target formation bed has been entered or exited, thereby enabling modifications to the drilling program that will provide much more value and higher success than would be the case using only seismic data.

Generally, resistivity inversion algorithms make certain assumptions to simplify calculations to provide results more quickly. In particular, an assumption that certain direction vectors are in plane may yield a systematic bias in an answer product. Making an assumption that one or more of total vertical depth (TVD) direction, true stratigraphic thickness (TST) direction, and tool axis direction are on the same plane may yield to an error in a formation characterization, such as a formation curtain plot, generated from measurements taken in the wellbore. The errors may cause a driller to drill in a sub-optimal direction. As such, a post processing algorithm that eliminates systemic errors in a formation characterization may allow a driller to drill a wellbore more efficiently, eliminate downtime, drill oil wells that are more productive, and increase safety of drilling operations. Providing a more accurate formation curtain plot may also provide more accurate estimates of oil and gas reserves within the formation.

BRIEF DESCRIPTION OF THE DRAWINGS

A better understanding of the various disclosed embodiments may be obtained when the following detailed description is considered in conjunction with the attached drawings, in which.

It should be understood that the drawings and corresponding detailed description do not limit the disclosure, but on the contrary, they provide the foundation for understanding all is modifications, equivalents, and alternatives falling within the scope of the appended claims.

DETAILED DESCRIPTION

This disclosure may generally relate to apparatuses, systems and methods for producing deep formation evaluations using logging while drilling ("LWD") tools with multiple sub-assemblies. In other examples, this disclosure may relate to apparatuses, systems and methods for producing deep formation evaluations using wireline logging having multiple sub-assemblies.

As previously discussed, a resistivity inversion method may use certain assumptions to generate a formation characterization such as a formation curtain plot. In particular, the true vertical depth (TVD) or depth with respect to the direction of gravity, true stratigraphic thickness direction (TST), and tool axis may be assumed to be in the same plane to simplify calculations. When the assumption does not hold true, a systematic bias may build in the system. Eliminating or reducing the systematic bias may lead to a better formation characterization that may allow a driller to drill a wellbore more efficiently, eliminate downtime, drill oil wells that are more productive, and increase safety of drilling operations. A resistivity measurement that has a relative azimuth angle correction applied may allow a driller to better adjust at least one drilling parameter, such as tool inclination angle, azimuth angle, or drilling direction and generate a formation curtain plot that can be used to more accurately estimate oil and gas reserves within a formation.

Figure 1:
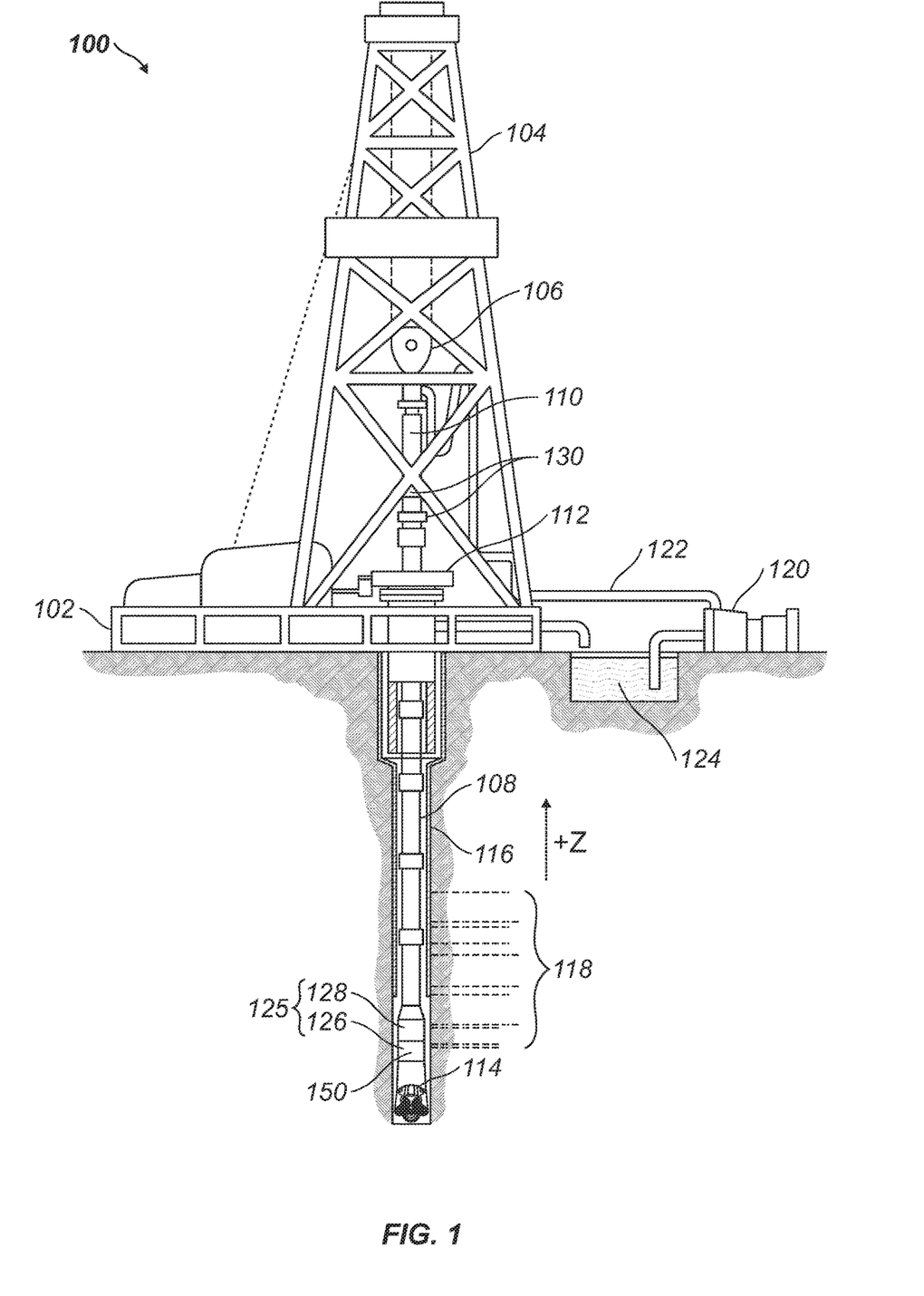
FIG. 1 shows an illustrative logging while drilling (LWD) environment.

The disclosed apparatuses, systems and methods may be best understood in the context of the larger systems in which they operate. FIG. 1 illustrates a diagrammatic view of an exemplary logging while drilling (LWD) and/or measurement while drilling (MWD) wellbore operating environment 100 in which the present disclosure may be implemented. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub assembly 128 to transfer measurement data to a surface receiver 130 and to receive commands from the surface. In some embodiments, the telemetry sub assembly 128 communicates with a surface receiver 130 using mud pulse telemetry. In other cases, the telemetry sub assembly 128 does not communicate with the surface, but rather stores logging data for later retrieval at the surface when the logging assembly is recovered. Notably, one or more of the bottom-hole assembly 125, the logging tools 126, and the telemetry sub assembly 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 4 in order to perform resistivity, or conductivity logging. The telemetry sub assembly 128 may include wireless telemetry or logging capabilities, or both, such as to transmit or later provide information indicative of received energy/waveforms to operators on the surface or for later access and data processing for the evaluation of formation 118 properties.

The logging tools 126, including the resistivity logging tool, may also include one or more computing device 150 communicatively coupled with one or more of the plurality of tool components. Computing device 150 may comprise components such as processors, memory, input/output devices, interfaces, and the like. The computing device 150 may be configured to control or monitor the performance of the logging tools 126, process logging data, and/or carry out the methods of the present disclosure.

In some embodiments, one or more of the logging tools 126 may communicate with a surface receiver 130, such as a wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub assembly 128, or both, until it is retrieved for processing.

Figure 2:
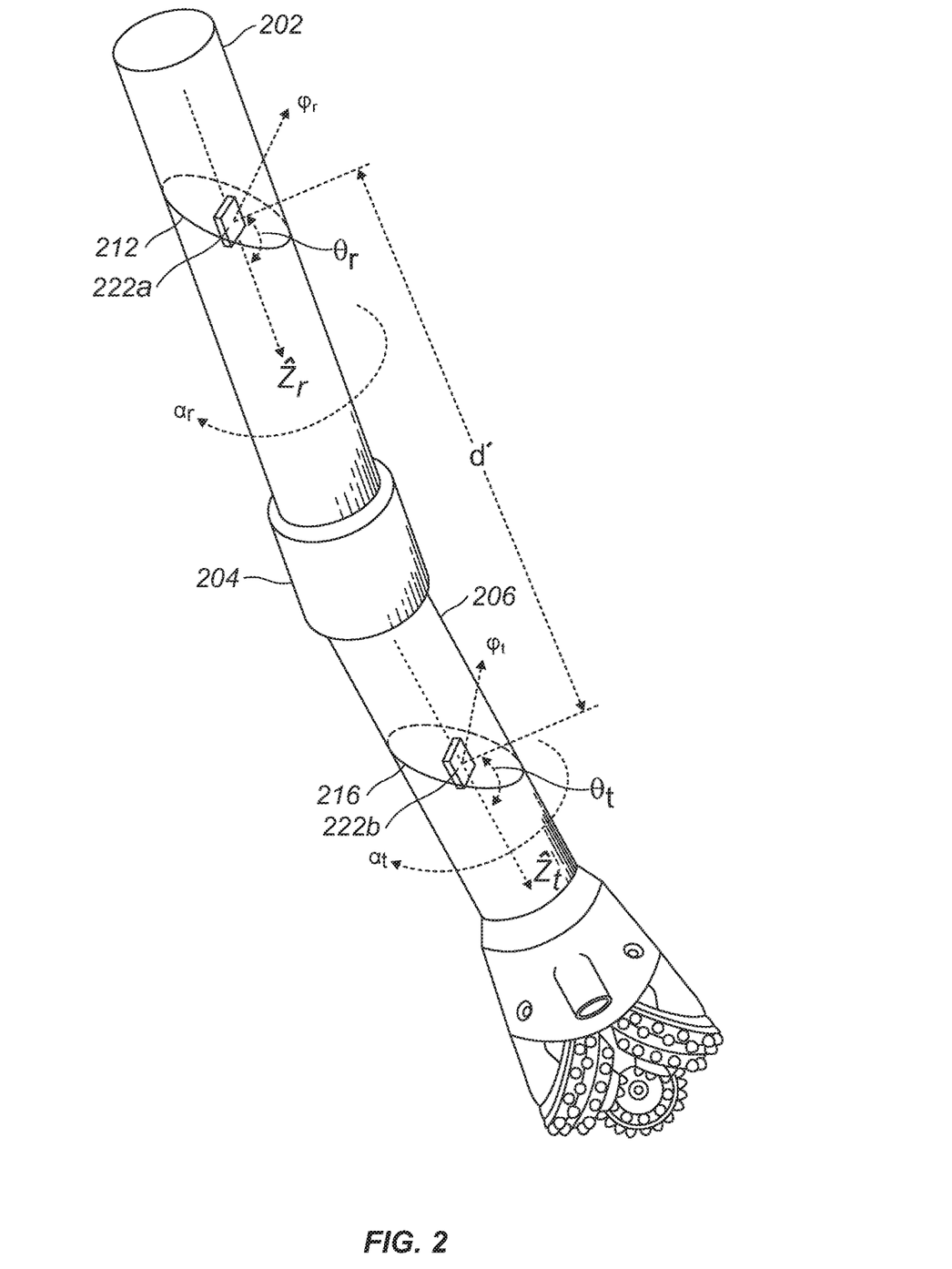
FIG. 2 shows an illustrative drillstring with two logging tool modules.

FIG. 2 shows an illustrative example of a deep formation evaluation logging tool that includes two LWD tool modules 202 and 206 at different locations and orientations along a drillstring. In the example shown, a resistivity logging tool receive antenna 212 and a corresponding receive antenna position measurement device 222 a may be housed within LWD tool module 202, while a resistivity logging tool transmit antenna 216 and a corresponding transmit antenna position measurement device 222 b (components of an "at bit" instrument) are housed within LWD tool module 206. The position measurement devices may locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool module's inclination angle ($\varphi_r$ and $\varphi_t$) and the distance d' between the antennas.

As a further complication to measuring formation resistivity, boreholes are generally perpendicular to formation beds. The angle between the axis of the well bore and the orientation of the formation beds (as represented by the normal vector) has two components. These components are the dip angle and the azimuth angle. The dip angle is the angle between the borehole axis and the normal vector for the formation bed. The azimuth angle is the direction in which the borehole's axis "leans away from" the normal vector. Electromagnetic resistivity logging measurements are a complex function of formation resistivity, formation anisotropy, and the formation dip and azimuth angles, which may all be unknown. A triaxial induction well logging tool may be used to detect formation properties such as resistivity anisotropy, which is one of the important parameters in evaluation subterranean formations such as sand-shale reservoirs or fractured reservoirs. However, the resistivity anisotropy parameter cannot be obtained without performing a numerical inversion process. Specifically, numerical inversion may be required to obtain accurate formation resistivity anisotropy parameters. The log inversion required for anisotropy determination may involve a large number of inversion parameters to be determined by an algorithm referred to as the 1D vertical inversion. Generally, this algorithm may require large amounts of processing time and be sensitive to noise from logging, the logging environment characteristics and borehole correction, which could result in errors in the inverted vertical resistivity.

Figure 3:
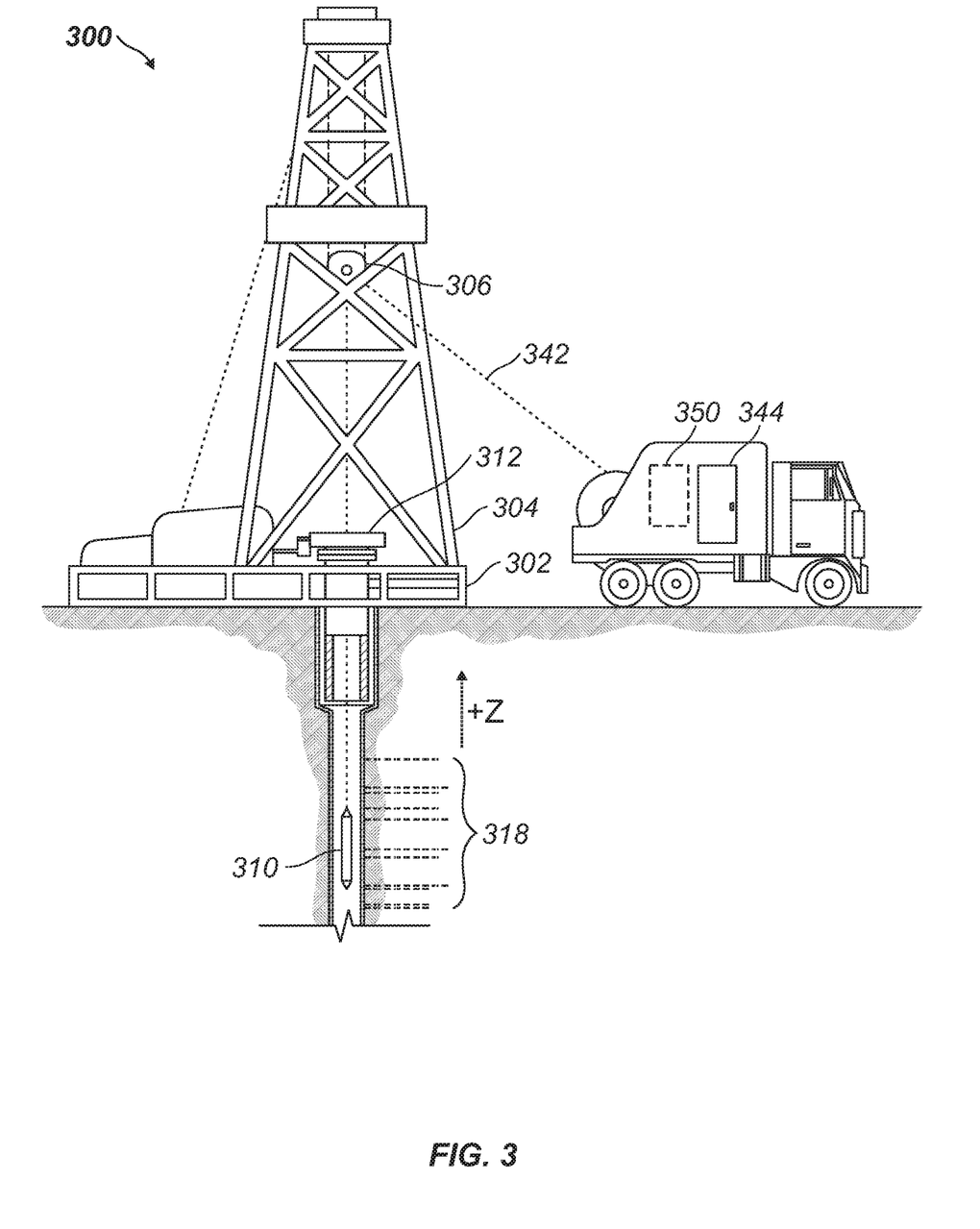
FIG. 3 shows an illustrative logging tool and a surface system.

FIG. 3 illustrates a diagrammatic view of a conveyance logging wellbore operating environment 300 in which the present disclosure may be implemented. As depicted in FIG. 3, a hoist 306 may be included as a portion of a platform 302, such as that coupled to derrick 304, and used with a conveyance 342 to raise or lower equipment such as resistivity logging tool 310 into or out of a borehole. Resistivity logging tool 310 may include, for example, tools such as the one shown in FIG. 4. A conveyance 342 may provide a communicative coupling between the resistivity logging tool 310 and a logging facility 344 at the surface. The conveyance 342 may include wires (one or more wires), slicklines, cables, or the like, as well as tubular conveyances such as ed tubing, joint tubing, or other tubulars, and may include a downhole tractor. Additionally, power can be supplied via the conveyance 342 to meet power requirements of the tool. The resistivity logging tool 310 may have a local power supply, such as batteries, downhole generator and the like. When employing non-conductive cable, ed tubing, pipe string, or downhole tractor, communication may be supported using, for example, wireless protocols (e.g. EM, acoustic, etc.), and/or measurements and logging data may be stored in local memory for subsequent retrieval. The logging facility 344 may include a computing device 350 capable of carrying out the methods and techniques of the present disclosure. In this manner, information about the formation 318 may be obtained by resistivity logging tool 310 and processed by a computing device, such as computing device 350. In some embodiments, computing device 350 is equipped to process the received information in substantially real-time, while in some embodiments, computing device 350 can be equipped to store the received information for processing at some subsequent time.

Table 1 lists some of terminology used herein.

TABLE 1

| Symbol | Definition |
| --- | --- |
| TVD Direction | True vertical depth direction is the direction of gravity. |
| TVDp Direction | On the plane spanned by tool axis and TST, we choose a direction TVDp such that γ (the angle between TVDp and Tool axis) = b (Tool inclination from TVD) |
| TST | True stratigraphic thickness direction |
| DTBB | Distance from reference point to bed boundary |
| a | Angle between Tool axis and TST |
| b | Tool inclination angle |
| c | Relative azimuth angle |
| ψ | Angle between TVDp and TST |
| γ | Angle between TVDp and Tool axis |

Figure 4:
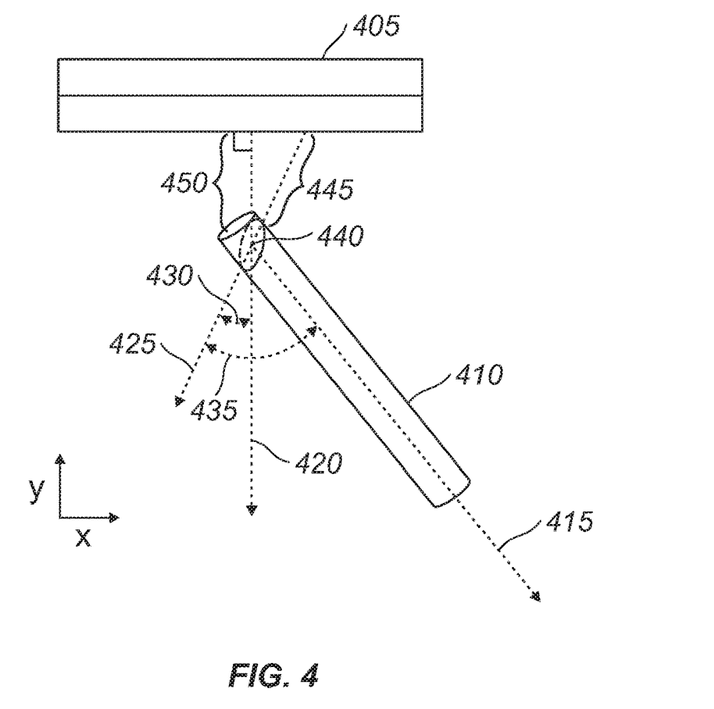
FIG. 4 shows and illustrative logging tool.
Figure 5:
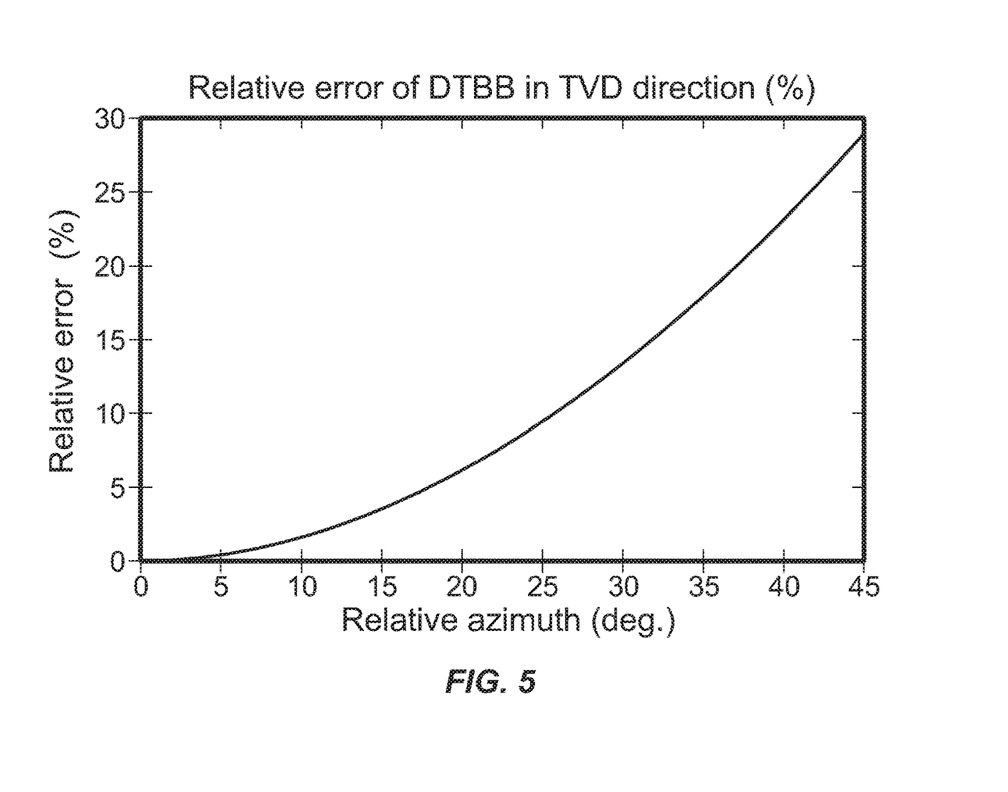
FIG. 5 shows a graph of the relative error with respect to the relative azimuth angle.

To determine the TVDp direction, a plane is drawn that bisects the tool axis and TST. Thereafter, a TVDp direction is chosen such that γ (the angle between TVDp and Tool axis)=b (Tool inclination from TVD). With reference to FIG. 4, FIG. 4 illustrates a wellbore tool 410 with a tool axis 415 defined parallel to wellbore tool 410 extending from reference point 440. Reference point 440 may be a transmitter, for example. TST direction 420 extends perpendicular from formation 405. TVDp direction 425 extends on the plane spanned by tool axis 415 and TST direction 420. Angle 435 between tool axis 415 and TVDp direction 425 is γ. Angle 430 between TVDp direction 425 and TST direction 420 is ψ. Distance 450 is DTBB. Distance 445 is a boundary distance in the TVDp direction. As will be appreciated by one of ordinary skill in the art, FIG. 4 illustrates a wellbore tool configuration where the relative azimuth is equal to zero. When the relative azimuth is equal to zero, the TVD direction is equal to TVDp direction and the TVD direction, TST direction, and tool axis are in the same plane, illustrated as an x-y plane in FIG. 4. However, when TVD direction, TST direction, tool axis are not on the same plane, the boundary position calculated has an error. The error may be calculated by Equation 1. A graph of the relative error with respect to the relative azimuth angle is illustrated in FIG. 5. As the relative azimuth angle increases, the relative error also increases.

$$\text{Relative Error} = \frac{|BoundaryPosition_{new} - BoundaryPosition_{old}|}{BoundaryPosition_{new}} \quad (1)$$

Figure 6:
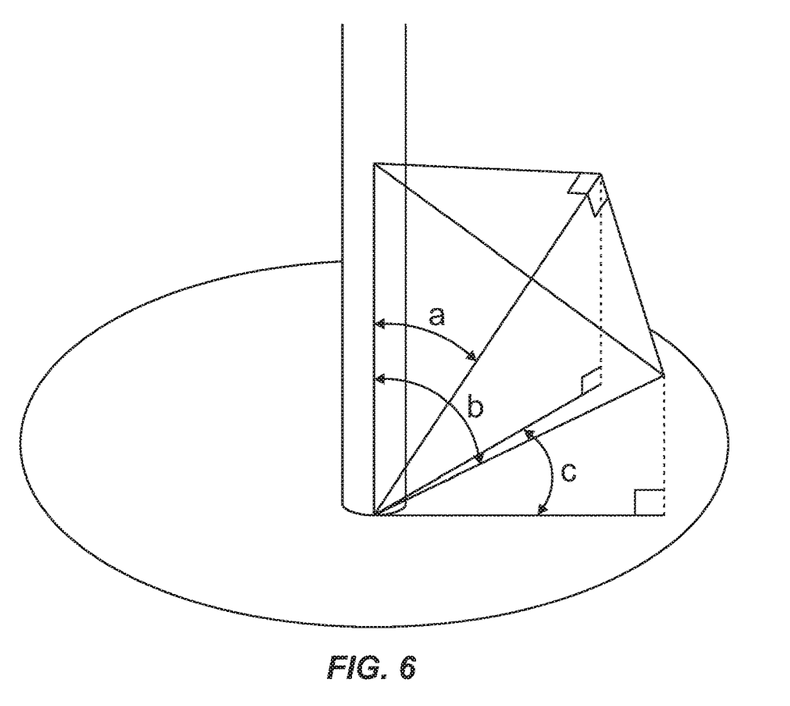
FIG. 6 shows a geometric representation of a logging tool.

A method to eliminate the systematic bias is will be described with reference to FIG. 6. The method may begin with obtaining a tool inclination angle b from survey measurement. The tool inclination angle b may be provided by other survey tools integrated into the tool. The relative azimuth angle c may be obtained by pre-processing. One of ordinary skill in the art will appreciate there may be many method of pre-processing to obtain the relative azimuth angle and further should be able to select an appropriate method. An inversion scheme may be applied to calculate ψ which is the angle between TVDp and TST. The angle a between the tool axis and TST direction may then be determined by Equation 2.

$$a=\gamma-\psi=b-\psi \quad (2)$$

After determining angle a, the DTBB (distance from reference point to bed boundary) may be calculated from equation 3.

$$\text{DTBB in TST direction} = \text{DTBB in TVDp direction} \times \cos(\psi) \quad (3)$$

Equation 3 may be rearranged to solve for DTBB in TVD direction in Equation 4.

$$\text{DTBB in TVD direction} = \frac{\text{DTBB in TST direction}}{\sin(a)\cos(c)\sin(b) + \cos(b)\cos(a)} \quad (4)$$

Figure 7:
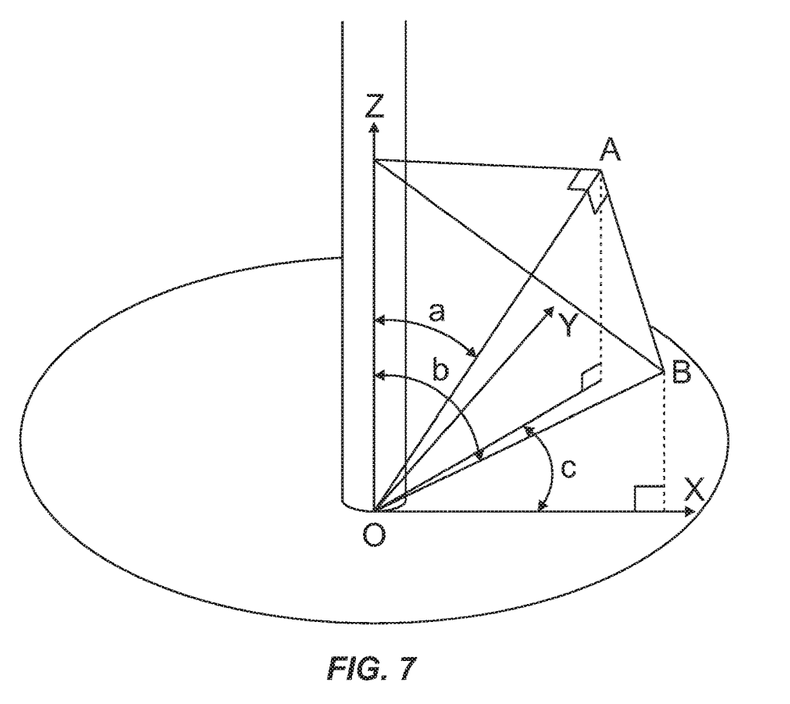
FIG. 7 shows a geometric proof of an error correcting method.

A proof of the method is illustrated with reference to FIG. 7. As illustrated in FIG. 7, two unit vectors may be defined by Equations 5 and 6.

$$\vec{OB} = \begin{bmatrix} \sin b \\ 0 \\ \cos b \end{bmatrix} \quad (5)$$

$$\vec{OA} = \begin{bmatrix} \sin a \cos c \\ \sin a \sin c \\ \cos a \end{bmatrix} \quad (6)$$

From Equations 5 and 6, an angle between the two vectors may be calculated by Equation 7.

$$\angle AOB = \operatorname{acos}\left(\frac{\vec{OA}\vec{OB}}{|\vec{OA}||\vec{OB}|}\right) = \operatorname{acos}(\sin a \cos c \sin b + \cos b \cos a) \quad (7)$$

From Equation 7, one of ordinary skill in the art will appreciate that the length of vector OB (DTBB in TVD direction) can be found by Equation 8.

$$|OB| = \frac{|OA|}{\cos \angle AOB} \quad (8)$$

Accordingly, the statements below may be used to practice certain aspects of this disclosure.

Statement 1. A method comprising: inserting into a wellbore penetrating a subterranean formation a tool comprising: a transmitter sub assembly comprising a transmitter; and a receiver sub assembly comprising a receiver; generating an electromagnetic wave at the transmitter; propagating the electromagnetic wave through the subterranean formation; receiving the electromagnetic wave in the receiver; generating a response signal in the receiver; calculating a distance to a bed boundary position in a TVDp direction, wherein the TVDp direction is a direction where an angle between the TVDp direction and a tool axis is equal to a tool inclination from a true vertical direction (TVD), wherein TVD is a direction with respect to gravity; calculating a distance to bed boundary in a TST direction, wherein the TST direction is a true stratigraphic thickness direction in a direction towards a bed boundary; calculating a distance to bed boundary in a TVD direction; generating a formation characterization comprising a visual representation of the response signal and the distance to bed boundary in the TVD direction.

Statement 2. The method of statement 1 wherein the distance to bed boundary in the TST direction is calculated by the following equation:

distance to bed boundary in TST direction=distance to bed boundary in TVD$p$ direction×cos($\psi$)

wherein $\psi$ is an angle between the TVD$p$ direction and the TST direction.

Statement 3. The method any of statements 1 or 2 wherein the distance to bed boundary in the TVD direction is calculated by the following equation:

$$\text{distance to bed boundary in } TVD \text{ direction} = \frac{\text{distance to bed boundary in } TST \text{ direction}}{\sin(a)\cos(c)\sin(b) + \cos(b)\cos(a)}$$

wherein b is a tool inclination angle obtained from a survey tool, wherein c is a relative azimuth angle obtained from pre-processing, and wherein a is an angle between an axis of the tool and the TST direction calculated by the following equation a=b−$\psi$.

Statement 4. The method any of statements 1-3 wherein the response signal is a measure of resistivity, conductivity, or both the resistivity and the conductivity.

Statement 5. The method any of statements 1-4 wherein the tool is part of a drill string and the method further comprises extending the wellbore through the subterranean formation.

Statement 6. The method any of statements 1-5 further comprising adjusting at least one drilling parameter based on the formation characterization.

Statement 7. The method any of statements 1-6 wherein the at least one drilling parameter is selected from the group consisting of tool inclination angle, azimuth angle, drilling direction and any combinations thereof.

Statement 8. A method comprising: inserting into a wellbore penetrating a subterranean formation a drill string comprising: a transmitter sub assembly comprising a transmitter; a receiver sub assembly comprising a receiver; and a wellbore drill bit; circulating a drilling fluid through an interior of the drill string, through the wellbore drill bit, and into an annulus defined between the wellbore and drill string; extending the wellbore through the subterranean formation; generating an electromagnetic wave at the transmitter; propagating the electromagnetic wave through the subterranean formation; receiving the electromagnetic wave in the receiver; generating a response signal in the receiver; measuring a tool inclination angle b; calculating a relative azimuth angle c from pre-processing; calculating an angle $\psi$ between a TVDp direction and TST direction, wherein the TVDp direction is a direction where an angle between the TVDp direction and a tool axis is equal to a tool inclination from a true vertical direction (TVD), wherein TVD is a direction with respect to gravity, and wherein the TST direction is a true stratigraphic thickness direction in a direction towards a bed boundary; calculating a distance to a bed boundary in the TST direction by the following equation: distance to bed boundary in TST direction=distance to bed boundary in TVDp direction×cos($\psi$) calculating a distance to a bed boundary in a TVD direction by the following equation:

$$\text{distance to bed boundary in } TVD \text{ direction} = \frac{\text{distance to bed boundary in } TST \text{ direction}}{\sin(a)\cos(c)\sin(b) + \cos(b)\cos(a)}$$

wherein a=b−$\psi$; generating a formation characterization comprising a visual representation of the response signal and the distance to the bed boundary in a true vertical depth direction; and adjusting at least one drilling parameter based on the formation characterization.

Statement 9. The method of statement 8 wherein the transmitter is a dipole source.

Statement 10. The method any of statements 8 or 9 wherein the response signal is a measure of resistivity, conductivity, or both the resistivity and the conductivity.

Statement 11. The method any of statements 8-10 wherein the at least one drilling parameter is selected from the group consisting of tool inclination angle, azimuth angle, drilling direction, and any combinations thereof.

Statement 12. The method any of statements 8-10 wherein the TVDp direction is not parallel with the TVD direction.

Statement 13. An apparatus comprising: a transmitter sub assembly comprising a transmitter; a receiver sub assembly comprising a receiver; a survey tool; a wellbore drill bit; wherein the transmitter sub assembly is configured to generate an electromagnetic wave at the transmitter and propagate the electromagnetic wave through a subterranean formation, wherein the receiver is configured to receive the electromagnetic wave and generate a response signal, and wherein the survey tool is configured to measure a tool inclination angle; at least one processor; and a memory coupled to the processor to provide software that configures the processor to calculate a relative azimuth angle c from pre-processing, calculate an angle $\psi$ between a TVDp direction and TST direction using an inversion scheme, and calculate a distance to a bed boundary in a true vertical depth direction by the following equation:

$$DTBB \text{ in } TVD \text{ direction} = \frac{DTBB \text{ in } TST \text{ direction}}{\sin(a)\cos(c)\sin(b) + \cos(b)\cos(a)}$$

wherein DTBB in TVD direction is the distance to the bed boundary in the true vertical depth direction and DTBB in TST direction is the distance to the bed boundary in a true stratigraphic thickness direction and where a=b−$\psi$, wherein the TVDp direction is a direction where an angle between the TVDp direction and a tool axis is equal to a tool inclination from a true vertical direction (TVD), wherein TVD is a direction with respect to gravity; and wherein the TST direction is a true stratigraphic thickness direction in a direction towards a bed boundary.

Statement 14. The apparatus of statement 13 wherein the transmitter is a dipole source.

Statement 15. The apparatus of any of statements 13 or 14 wherein the response signal is a measure of resistivity, conductivity, or both.

Statement 16. The apparatus of any of statements 13-15 wherein the software further configures the processor to generate a formation characterization comprising a visual representation of the response signal and the distance to the bed boundary in the true vertical depth direction.

Statement 17. The apparatus of any of statements 13-16 wherein the software further configures the processor to adjust at least one drilling parameter based on the formation characterization.

Statement 18. The apparatus of any of statements 13-17 wherein the at least one drilling parameter is selected from the group consisting of tool inclination angle, azimuth angle, drilling direction and any combinations thereof.

Statement 19. The apparatus of any of statements 13-18 wherein the software is configured to accept a user input and adjust the at least one drilling parameter.

Statement 20. The apparatus of any of statements 13-19 wherein the adjusting at least one drilling parameter is automatic or selected by a user.

EXAMPLE

Figure 8A:
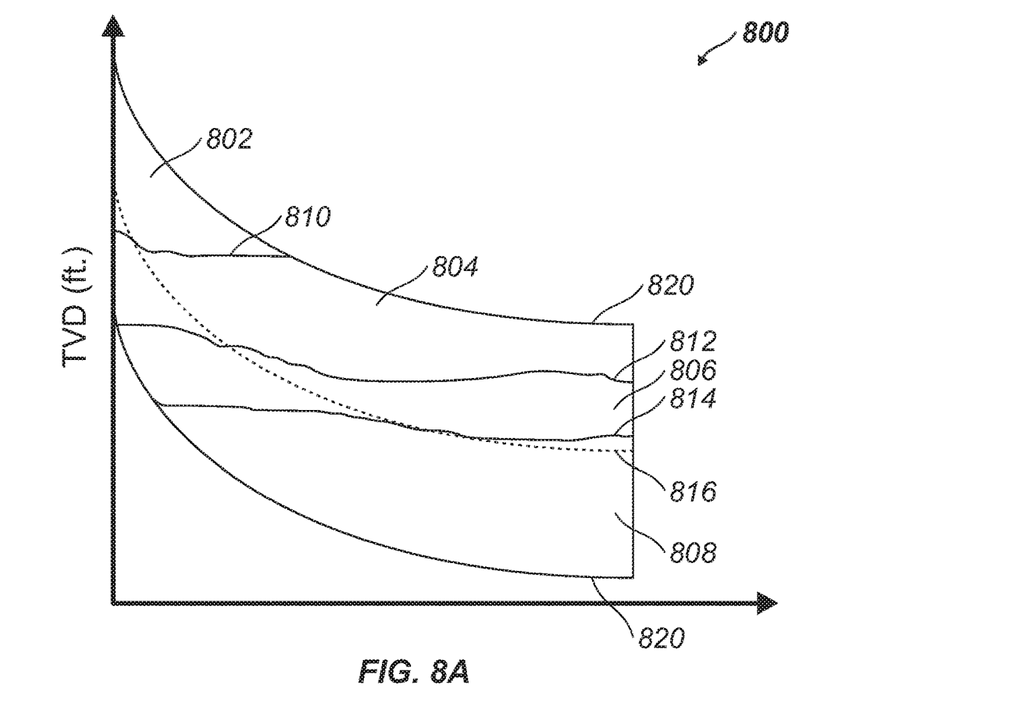
FIG. 8a shows an uncorrected curtain plot for a synthetic dataset.
Figure 8B:
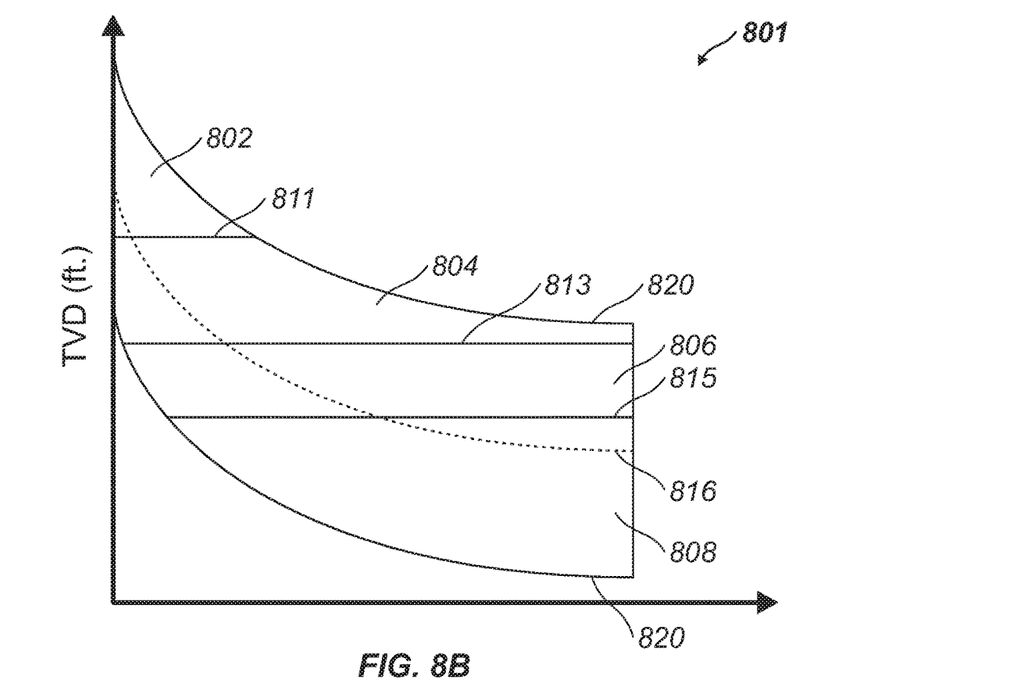
FIG. 8b shows a corrected curtain plot for a synthetic dataset.

The above described relative azimuthal correction method was applied to a synthetic dataset to evaluate the effectiveness of the method. A plot 800 was generated with the synthetic dataset illustrated in FIG. 8*a*. Plot 800 illustrates first layer 802, second layer 804, third layer 806, and fourth layer 808 penetrated by well path 816 and bounded by detection area 820. The layers are separated by bed boundaries 810, 812, and 814. As illustrated in FIG. 8*a*, each of the bed boundaries is distorted due to systematic bias. FIG. 8*b* illustrates plot 801 after the relative azimuthal correction method has been applied. It was observed that the relative azimuthal direction correction resulted in undistorted bed boundaries 811, 813, and 815 through removal of the systematic bias.

The preceding description provides various examples of the wellbore tools and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:
1. A method comprising:
   inserting into a wellbore penetrating a subterranean formation a tool comprising:
      a transmitter sub assembly comprising a transmitter; and
      a receiver sub assembly comprising a receiver;
   generating an electromagnetic wave at the transmitter;
   propagating the electromagnetic wave through the subterranean formation;
   receiving the electromagnetic wave in the receiver;
   generating a response signal in the receiver;
   calculating a distance to a bed boundary in a pseudo true vertical depth (TVDp) direction using the response signal, wherein the TVDp direction is on a plane spanned by a tool axis and a true stratigraphic thickness (TST) direction and forms an angle between the TVDp direction and the tool axis is equal to a tool inclination from a true vertical depth (TVD) direction, wherein the TVD is a direction with respect to gravity;
   calculating a distance to a bed boundary in a pseudo true vertical depth (TVDp) direction using the response signal, wherein the TVDp direction is on a plane spanned by a tool axis and a true stratigraphic thickness (TST) direction and forms an angle between the TVDp direction and the tool axis equal to a tool inclination from a true vertical depth (TVD) direction, wherein the TVD is a direction with respect to gravity;
   calculating a distance to the bed boundary in the TST direction using the response signal, wherein the TST direction is a true stratigraphic thickness direction in a direction perpendicular to a bed boundary;
   calculating a distance to the bed boundary in a TVD direction using the response signal; and
   generating a formation characterization comprising a visual representation of the response signal and the distance to the bed boundary in the TVD direction is calculated from the distance to the bed boundary in the TST direction,
wherein the distance to the bed boundary in the TST direction is calculated from the distance to the bed boundary in the TVDp direction by the following equation:

distance to the bed boundary in the TST direction=distance to the bed boundary in the TVD$p$ direction×cos($\psi$)

wherein $\psi$ is an angle between the TVDp direction and the TST direction,
wherein the distance to bed boundary in the TVD direction is calculated by the following equation:

$$\text{distance to bed boundary in the } TVD \text{ direction} = \frac{\text{distance to bed boundary in } TST \text{ direction}}{\sin(a)\cos(c)\sin(b) + \cos(b)\cos(a)},$$

and wherein b is a tool inclination angle obtained from a survey tool, wherein c is a relative azimuth angle obtained from pre-processing, and wherein a is an angle between an axis of the tool and the TST direction calculated by the following equation a=b−$\psi$.

2. The method of claim 1 wherein the response signal is a measure of resistivity, conductivity, or both the resistivity and the conductivity.

3. The method of claim 1 wherein the tool is part of a drill string and the method further comprises extending the wellbore through the subterranean formation.

4. The method of claim 3 further comprising adjusting at least one drilling parameter based on the formation characterization.

5. The method of claim 4 wherein the at least one drilling parameter is selected from the group consisting of tool inclination angle, azimuth angle, drilling direction and any combinations thereof.

6. A method comprising:
inserting into a wellbore penetrating a subterranean formation a drill string comprising:
a transmitter sub assembly comprising a transmitter;
a receiver sub assembly comprising a receiver; and
a wellbore drill bit;
circulating a drilling fluid through an interior of the drill string, through the wellbore drill bit, and into an annulus defined between the wellbore and drill string;
extending the wellbore through the subterranean formation;
generating an electromagnetic wave at the transmitter;
propagating the electromagnetic wave through the subterranean formation;
receiving the electromagnetic wave in the receiver;
generating a response signal in the receiver;
measuring a tool inclination angle b;
calculating a relative azimuth angle c from pre-processing;
calculating an angle ψ between a pseudo true vertical depth direction (TVDp) direction and a true stratigraphic thickness (TST) direction using the response signal, wherein the TVDp direction is on a plane spanned by a tool axis and the TST direction and forms an angle between the TVDp direction and the tool axis equal to a tool inclination from a true vertical depth (TVD) direction, wherein the TVD direction is a direction with respect to gravity, and wherein the TST direction is a true stratigraphic thickness direction in a direction perpendicular to a bed boundary;
calculating a distance to the bed boundary in the TST direction using the distance to the bed boundary in the TVDp direction by the following equation:

distance to the bed boundary in the TST direction=distance to the bed boundary in the TVDp direction×cos(ψ);

calculating a distance to the bed boundary in the TVD direction by the following equation:

distance to the bed boundary in the $TVD$ direction =
$$\frac{\text{distance to bed boundary in } TST \text{ direction}}{\sin(a)\cos(c)\sin(b) + \cos(b)\cos(a)}$$

wherein a=b−ψ;
generating a formation characterization comprising a visual representation of the response signal and the distance to the bed boundary in a true vertical depth direction; and
adjusting at least one drilling parameter based on the formation characterization.

7. The method of claim 6 wherein the transmitter is a dipole source.

8. The method of claim 6 wherein the response signal is a measure of resistivity, conductivity, or both the resistivity and the conductivity.

9. The method of claim 6 wherein the at least one drilling parameter is selected from the group consisting of tool inclination angle, azimuth angle, drilling direction, and any combinations thereof.

10. The method of claim 6 wherein the TVDp direction is not parallel with the TVD direction.

11. An apparatus comprising:
a transmitter sub assembly comprising a transmitter;
a receiver sub assembly comprising a receiver;
a survey tool;
a wellbore drill bit;
wherein the transmitter sub assembly is configured to generate an electromagnetic wave at the transmitter and propagate the electromagnetic wave through a subterranean formation, wherein the receiver is configured to receive the electromagnetic wave and generate a response signal, and wherein the survey tool is configured to measure a tool inclination angle;
at least one processor; and
a memory coupled to the processor to provide software that configures the processor to calculate a relative azimuth angle c from pre-processing, calculate an angle ψ between a pseudo true vertical depth direction (TVDp) direction and a true stratigraphic thickness (TST) direction from the response signal and using an inversion scheme, and calculate a distance to a bed boundary in a true vertical depth (TVD) direction by the following equation:

a distance from a reference point to the bed boundary $$(DTBB) \text{ in } TVD \text{ direction} = \frac{DTBB \text{ in } TST \text{ direction}}{\sin(a)\cos(c)\sin(b) + \cos(b)\cos(a)}$$

wherein DTBB in TVD direction is the distance to the bed boundary in the TVD direction and DTBB in the TST direction is the distance to the bed boundary in a TST direction and where a=b−ψ, wherein the TVDp direction is on a plane spanned by a tool axis and the TST direction and forms an angle between the TVDp direction and the tool axis equal to a tool inclination from the TVD direction, wherein the TVD is a direction with respect to gravity, and wherein the TST direction is a true stratigraphic thickness direction in a direction towards a bed boundary.

12. The apparatus of claim 11 wherein the transmitter is a dipole source.

13. The apparatus of claim 11 wherein the response signal is a measure of resistivity, conductivity, or both.

14. The apparatus of claim 11 wherein the software further configures the processor to generate a formation characterization comprising a visual representation of the response signal and the distance to the bed boundary in the true vertical depth direction.

15. The apparatus of claim 14 wherein the software further configures the processor to adjust at least one drilling parameter based on the formation characterization.

16. The apparatus of claim 15 wherein the at least one drilling parameter is selected from the group consisting of tool inclination angle, azimuth angle, drilling direction and any combinations thereof.

17. The apparatus of claim 15 wherein the software is configured to accept a user input and adjust the at least one drilling parameter.

18. The apparatus of claim 11 wherein the adjusting at least one drilling parameter is automatic or selected by a user.

* * * * *